(12) United States Patent
Scheid

(10) Patent No.: US 9,299,271 B2
(45) Date of Patent: Mar. 29, 2016

(54) TEAR-RESISTANT WRISTBAND

(75) Inventor: James Michael Scheid, Delaware, OH (US)

(73) Assignee: XPRESS SYSTEMS, LLC, Canonsburg, PA (US)

(*) Notice: Subject to any disclaimer, the term of this patent is extended or adjusted under 35 U.S.C. 154(b) by 1125 days.

(21) Appl. No.: 12/897,810

(22) Filed: Oct. 5, 2010

(65) Prior Publication Data

US 2012/0082814 A1    Apr. 5, 2012

(51) Int. Cl.
| | |
|---|---|
| B32B 38/04 | (2006.01) |
| B32B 37/12 | (2006.01) |
| B32B 37/02 | (2006.01) |
| G09F 3/10 | (2006.01) |
| C09J 7/02 | (2006.01) |
| G09F 3/00 | (2006.01) |
| B32B 38/00 | (2006.01) |
| G09F 3/02 | (2006.01) |

(52) U.S. Cl.
CPC ............... *G09F 3/005* (2013.01); *B32B 38/04* (2013.01); *B32B 38/0004* (2013.01); *B32B 38/145* (2013.01); *B32B 2535/00* (2013.01); *G09F 2003/0226* (2013.01); *G09F 2003/0229* (2013.01); *Y10T 428/1476* (2015.01); *Y10T 428/15* (2015.01); *Y10T 428/24074* (2015.01)

(58) Field of Classification Search
USPC .................... 428/343, 41.8, 43, 107
See application file for complete search history.

(56) References Cited

U.S. PATENT DOCUMENTS

| | | | |
|---|---|---|---|
| 4,682,431 A * | 7/1987 | Kowalchuk | ..................... 40/633 |
| 5,448,846 A | 9/1995 | Peterson et al. | |
| 5,457,906 A | 10/1995 | Mosher, Jr. | |
| 5,479,797 A | 1/1996 | Peterson | |
| 5,493,805 A | 2/1996 | Penuela et al. | |
| 5,581,924 A | 12/1996 | Peterson | |
| 5,615,504 A | 4/1997 | Peterson et al. | |
| 5,740,623 A | 4/1998 | Juhan et al. | |
| 5,799,426 A | 9/1998 | Peterson | |
| D414,130 S | 9/1999 | Rutler | |
| 5,973,598 A | 10/1999 | Beigel | |
| 5,973,600 A | 10/1999 | Mosher, Jr. | |
| 5,979,941 A | 11/1999 | Mosher, Jr. et al. | |
| 6,782,648 B1 | 8/2004 | Mosher, Jr. | |
| 6,888,502 B2 | 5/2005 | Beigel et al. | |
| 7,071,826 B2 | 7/2006 | Peterson | |
| 7,137,216 B2 | 11/2006 | Ali et al. | |
| 7,197,842 B2 | 4/2007 | Ali | |
| 7,240,446 B2 | 7/2007 | Bekker | |

OTHER PUBLICATIONS

"Definition of Primer", Dec. 10, 2012.*

* cited by examiner

*Primary Examiner* — Cheng Huang
(74) *Attorney, Agent, or Firm* — Eckert Seamans Cherin & Mellott, LLC; David C. Jenkins

(57) ABSTRACT

A wristband is provided. The wristband includes an elongated first body, an elongated second body, and an adhesive coupling system all of which are disposed in layers. The first body, which is the upper layer has an outer surface that is a printing surface. The second body, which is the lower layer is made from a comfortable fibrous sheet material. The adhesive is disposed between the two bodies, thereby coupling the bodies together. A portion at one end of the second body, a tab portion, has a release coating on the inner surface. In this configuration, the tab can be removed and the adhesive underneath can be attached to the other end of the wristband. As the tab is part of the second body, as opposed to a separate release liner, the wristband may be disposed on a roll and passed through a label printer.

1 Claim, 7 Drawing Sheets

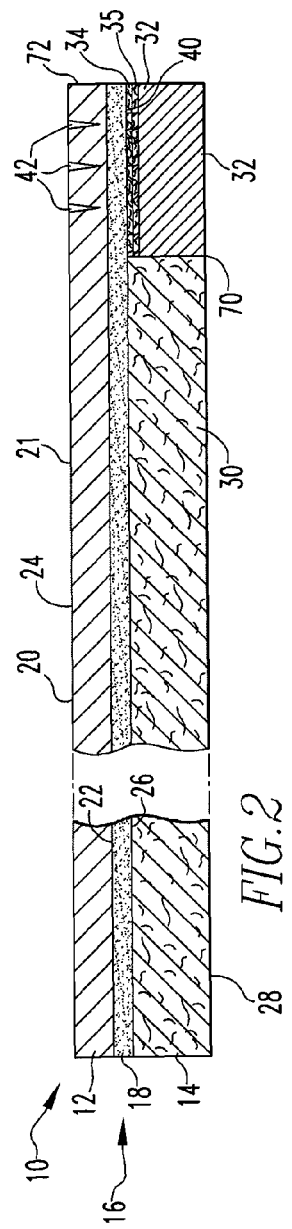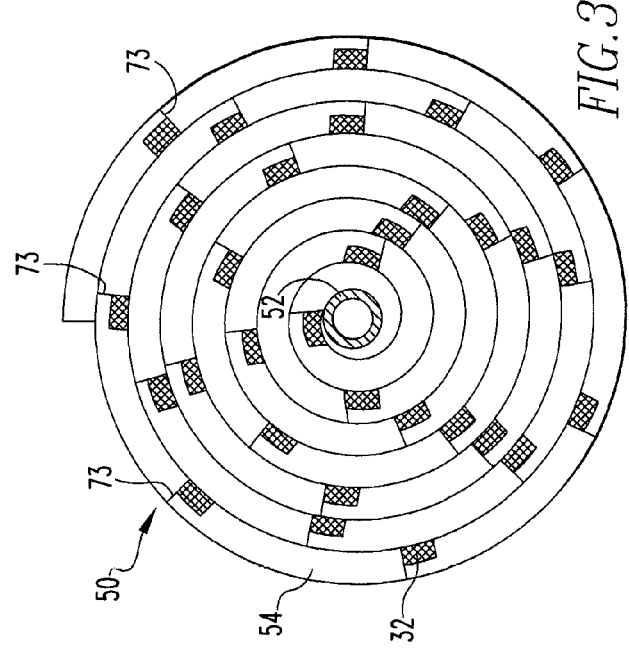

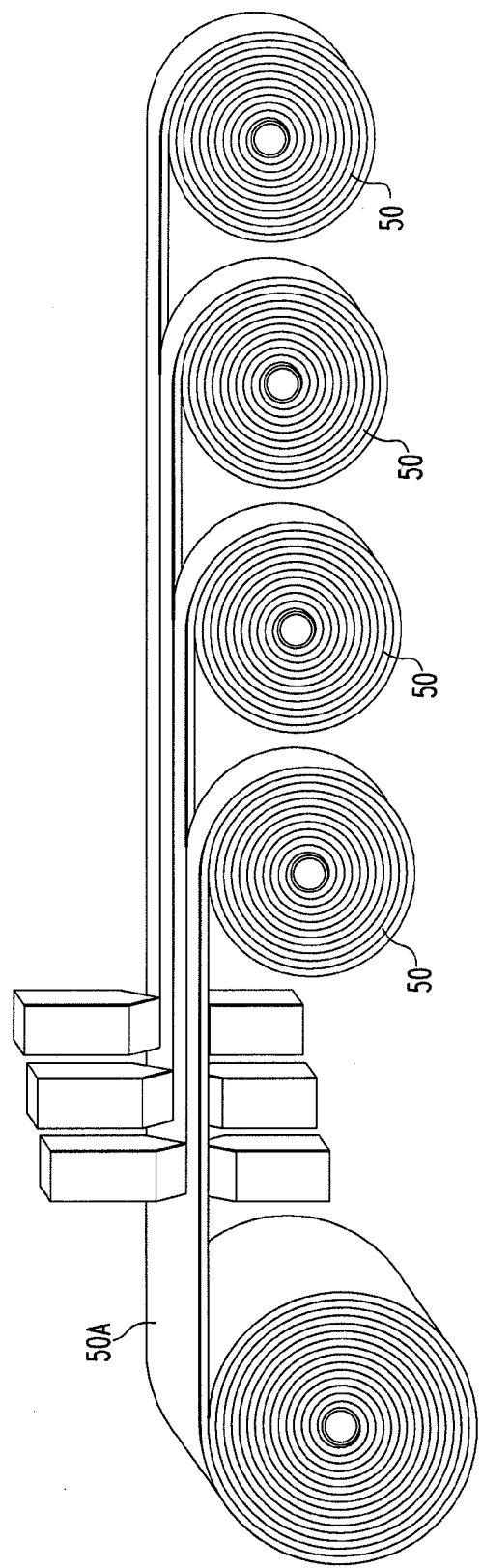

TEAR-RESISTANT WRISTBAND

BACKGROUND OF THE INVENTION

1. Field of the Invention

This invention relates to wristbands and, more specifically, to a wristband having two substantially parallel layers or bodies, a soft inner body and an outer body with a printable outer surface.

2. Background Information

A wristband is an elongated, narrow, and typically thin body structured to have the ends coupled together. The wristband is, typically, provided to a user as a flat body which the user wraps about their wrist and couples the ends, thereby forming a bracelet-like band about the wrist. To resist removal of the wristband, the diameter of the wristband during use is smaller than the user's hand. Wristbands, which are typically inexpensive and disposable, have many uses including, but not limited to, identification of patients in medical facilities and identification of participants and/or audience members at events. Wristbands may be worn for a few hours, e.g. at an event or in an emergency room, or for a longer period of time, e.g. an extended stay at a hospital. The concept disclosed and claimed below relates to an inexpensive wristband having a comfortable material against the user's skin, and which is structured to be printed upon by a label printer. Therefore, the remainder of the specification shall refer to medical wristbands, patients, etc. but it is understood that the disclosed and claimed wristbands can be used for any purpose.

A person wearing a wristband at a medical facility may be required to wear the wristband for an extended period, including during activities such as sleep which may be disturbed by an uncomfortable wristband. The wristband provides identification of the patient, some of whom cannot speak or are otherwise unable to provide identification. This information is vital as identification of the patient is required to ensure each patient receives their specific treatment. Wristbands may include additional information such as, but not limited to, allergies, patient identification number, etc. Unfortunately, patients are not always cooperative, or may not be able to control their actions, and often try to remove their wristbands. The desire to ensure the wristband remains on the patient was, generally, considered to be more important than the desire to have a comfortable wristband. Thus, wristbands were initially made from resilient, but uncomfortable, materials. One type of "uncomfortable material," as used herein, is a substantially solid plastic, or other polymer, that does not breathe. That is, a plastic material that does not allow air to flow through the material is uncomfortable.

Further, the coupling device for coupling the wristband ends must resist efforts to remove the wristband. Coupling devices, such as, but not limited to, snaps and clips, were, and still may be, bulky or otherwise uncomfortable. Other coupling devices, for example a tab and slot device, result in a wristband configuration that does not lay flat against the user's skin. This configuration is also uncomfortable.

Two separate improvements to wristbands include the use of more comfortable materials, such as fibrous sheet material, which is resistant to damage, while being breathable, water resistant, and inexpensive. It is, however, difficult to print on fibrous sheet material without a ribbon type printer. Thus, wristbands made from multiple layers, or bodies, were created. These would typically include one body that was the fibrous sheet material, for strength and comfort, and a second body that included a printing surface. These bodies, and possibly others, were joined together in a multilayered wristband.

Separately, adhesive coupling devices have replaced bulky snaps and clips. The adhesive is disposed at one end of the wristband body and, prior to use, protected by a release liner. That is, the adhesive is disposed on a limited portion of the wristband body surface, typically the portion is a small fraction of the wristband's length. The release liner is disposed over this portion of the wristband body. That is, the wristband has a number of layers and, at the location of the release liner, there is an additional layer. This type of wristband is typically produced in sheets similar to a typical sheet of paper. That is, wristbands, which are generally rectangular, are disposed in parallel, i.e. wristbands are temporarily coupled by perforations disposed along their long, or longitudinal, sides. In this configuration, the sheet of wristbands may be used in a typical printer, such as, but not limited to, an inkjet printer, a laser printer, a thermal printer, or a dot matrix printer.

Medical facilities, as well as other facilities, have typically relied upon label printers for wristbands. Label printers are smaller, less expensive, and typically portable. Label printers, however, are fed by rolls of wristbands. That is, the blank, rectangular wristbands are not coupled along their longitudinal edges, but rather by the short ends, i.e. the longitudinal ends. This configuration forms an elongated web of wristbands disposed in series. The wristbands disposed in series are wound about a core as a reel to form the roll of blank wristbands.

Rolls of blank wristbands, however, do not use the separate, localized adhesive/release liners, e.g. a separate body having a release coating thereon that covers only the adhesive portion of the wristband body. This configuration would not function with common label printers. That is, while an individual release liner has a minimal thickness, multiple release liners disposed on a roll have a combined effect resulting in an asymmetrical reel, as shown in FIG. 1.

Instead, rolls of wristbands typically include two bodies; an outer body, which is typically a non-breathable plastic, having a printable surface and a liner. The outer body and liner are coupled by an adhesive. The liner, which is also a non-breathable material, has a release coating applied to at least a small portion thereof. The liner is applied to the entire back surface of a wristband while having a removable tab at the location of the release coating. When this tab is removed a small portion of the adhesive backing is exposed and may be used as a coupling device. Thus, the bulk of the material contacting the user's skin is the non-breathable liner. As such, wristbands that are printed on a label printer either have an uncomfortable liner disposed adjacent the user's skin or rely on the less comfortable tab/slot device or other uncomfortable coupling devices.

SUMMARY OF THE INVENTION

The disclosed and claimed concept provides for a wristband having a first body, a second body, and an adhesive coupling system. The first body, the upper body (or outer body when wrapped about a wrist) has an outer surface that is a printing surface. The second body, the lower body (or inner body when wrapped about a wrist) is made from the comfortable fibrous sheet material The adhesive is disposed between the two bodies, thereby coupling the bodies together. A small portion, or tab portion, of the second body is separated from the remainder of the second body by a cut in the second material body. The first surface of the tab portion is covered with a release coating so that the tab portion does not adhere to the first body. The tab portion of the second body acts as a release liner, i.e. a protective cover that prevents exposure of the adhesive, until the tab is removed thereby exposing the adhesive on the second side of the first body. The adhesive may then be used as a coupling device.

During manufacture, the first body, which has an adhesive on one side, is coupled to the second body. After the bodies are joined, a lateral cut (perpendicular to the longitudinal axis of the wristband) is made in the second body near, but spaced, from one end of the wristband. This cut separates the tab portion from the remainder of the second body. In this configuration, the tab portion of the second body, i.e. the breathable material, acts as a removable, protective liner for that portion of the first body coupled to the tab portion. This portion of the first body has adhesive disposed thereon (as does the rest of the first body).

In this configuration, and prior to the removal of the second body tab portion, the outer surfaces of the wristband, i.e. the upper surface of the first material and the lower surface of the second material, are substantially parallel over the length of the wristband. In this configuration, the wristband, or more specifically an elongated web of wristbands coupled in series, can be wrapped about a core to form a roll. Such a roll is structured for use in a label printer. After a wristband has been prepared by the label printer, the user separates the prepared wristband from the reel, i.e. the web wound about a core, for use. To use the wristband, the user places the wristband about a wrist, removes the tab portion of the fibrous second material, thereby exposing a portion of adhesive on the first body, and couples the exposed adhesive to the opposing end of the wristband on the first body. Further, the wristband coupling is substantially flat, i.e. not a bulky coupling, and the soft fibrous sheet material is disposed adjacent the skin. Thus, the wristband is both comfortable and may be printed in a label printer.

The method of making the wristband, detailed above, is also disclosed. Preferably, the first and second bodies are each part of an elongated web of the disclosed material. The first material is, preferably, a polymer sheet having an adhesive applied to one side and protected by a release liner. The second body is a fibrous sheet material that is "breathable," which, as used herein, means the material is structured to allow air to pass therethrough. A release coating is applied to a portion of the second material web. This portion of the second material web will become a tab. The release coating on the upper surface of the second body material web causes the tab portion to be temporarily coupled to the adhesive on the first body. The first body material release liner is removed and the two webs are coupled together. The web of second material is then cut on one side, the inner side, of each tab portion. The combined web (both first and second material bodies) are then perforated on the other side of the tab portion. Thus, the edge of the wristband is also the edge of the tab portion. Each length of the combined web in between perforations is a wristband. Further, the perforation and the cut in the second material body defines the removable tab portion. After printing, the wristband is decoupled from the web and used as a wristband as described above.

BRIEF DESCRIPTION OF THE DRAWINGS

A full understanding of the invention can be gained from the following description of the preferred embodiments when read in conjunction with the accompanying drawings in which:

FIG. 2 is an exaggerated cross-sectional view of a wristband.

FIG. 3 is an exaggerated side view of a roll of wristbands.

FIG. 5A is a top view of an individual sheet, FIG. 5B is an isometric view of a fan sheet, and FIG. 5C is a top view of a combined sheet.

FIG. 8 is a schematic side view of a machine for cutting the joint web into printer sized rolls.

DESCRIPTION OF THE PREFERRED EMBODIMENTS

As used herein, a "fibrous sheet material" means a breathable material comprised of fibers, preferably synthetic fibers, that are bound together such as, but not limited to, Tyvek®, manufactured by DuPont, P.O. Box 80728, Wilmington, Del. 19880-0728.

As used herein, a "printing surface" is a surface specifically structured to be printed upon. Such surfaces include, but are not limited to, a thermally sensitive material that darkens when heated as in a thermal printer.

Directional indications, e.g. "upper," "lower," etc. are relative to the orientation of the wristband as shown in the figures and are not limiting in the claims.

As used herein, "coupled" means a link between two or more elements, whether direct or indirect, so long as a link occurs.

As used herein, "directly coupled" means that two elements are directly in contact with each other.

As used herein, "fixedly coupled" or "fixed" means that two components are coupled so as to move as one while maintaining a constant orientation relative to each other.

As used herein, "temporarily coupled" means that two components are coupled in a manner that allows for the components to be easily decoupled without damaging the components. A device for "temporarily coupling" elements together may be, but is not limited to, perforations that couple portions of a paper-like material together. Another example of a device structured to temporarily couple two elements together is an adhesive coupled to a release material.

As used herein, two surfaces that "substantially parallel over the length" of an associated component, i.e. the component having the identified surface, means that the two surfaces maintain a consistent spacing without any significant variation. It is noted that, as the relevant components disclosed herein are thin bodies, even a thin, but intermittent release liner between adjacent bodies, as when the bodies are wound about a core, is sufficient to offset a portion of the bodies thereby preventing the surfaces of the bodies from being "substantially parallel over the length" of the bodies.

As used herein, "disposed in series," when referring to elongated bodies, means that the bodies are coupled at the longitudinal ends.

As used herein, "disposed in parallel," when referring to elongated bodies, means that the bodies are coupled along their longitudinal sides/edges.

As used herein, "reel" means a quantity of something wound on a core.

As used herein, a "score" is a cut in an element that does not extend through the component. A "score" may, however, extend through a subcomponent of the element. For example, in a wristband having two layers, a score may extend through one layer.

As used herein, a "perforation" is an intermittent cut through an element. In the example above of a two-layer wristband, a "perforation" would extend through both layers.

Figure 7:
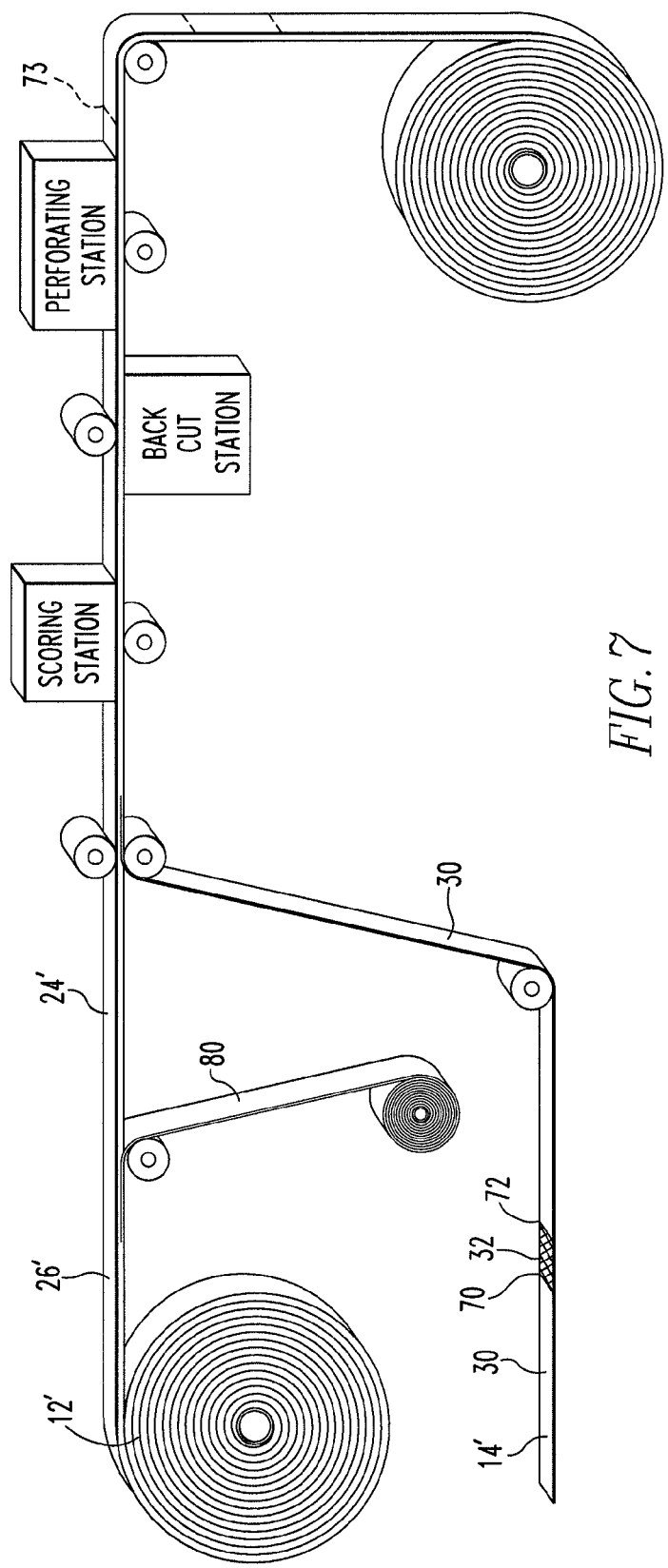
FIG. 7 is a schematic side view of a machine for processing the first material web and joining the webs.

As shown in FIG. 2, a wristband 10 includes a first thin, narrow, and elongated body 12, a second thin, narrow, and elongated body 14, and an adhesive system 16. Preferably, the wristband 10, which also means the first and second bodies 12, 14 have a length of between about 6.0 inches to 20.0 inches and more preferably about 11⅝ inches, which is sufficient to accommodate most adult wrists. The wristband 10 may, however, be shorter if it is adapted for children and/or infants. The first body 12 is, preferably, a polymer. The second body 14 is a fibrous sheet material that allows air to pass through the body. The second body 14, by virtue of its breathable nature and softness, is a comfortable material. The adhesive system 16 includes an adhesive 18 and, at one point in time, may include a removable release liner 80 (FIG. 7), as discussed below. The adhesive 18 is structured to adhere to both the first body 12 and the breathable fibrous second body 14.

The first body 12 has a first, upper surface 20 and a second lower surface 22. The first body first surface 20 is a printing surface 24. The printing surface 24 may also have a protective coating 21 applied thereto. The protective coating 21, preferably, is structured to resist chemicals and solvents such as, but not limited to, soap and disinfecting agents. The adhesive 18 is disposed on the first body second surface 22.

The breathable fibrous second body 14 also has a first, upper surface 26 and a second, lower surface 28. The breathable fibrous second body 14 is divided into a first, elongated portion 30 and a second tab portion 32. The tab portion 32 is disposed at one end of the elongated breathable fibrous second body 14. Preferably, the tab portion 32 extends to, and comprises, one end of the elongated breathable fibrous second body 14. The second body first, elongated portion 30 is longer than the tab portion 32 and is, preferably, more than 75% of the length of the breathable fibrous second body 14. As discussed below, a release coating 34 is applied to the first surface 26 of the second body tab portion 32. Further, as the release coating may soak into the breathable fibrous second body 14, a primer 35 may be applied to the first surface 26 of the second body tab portion 32 prior to the application of the release coating 34. The primer 35 is structured to reduce the amount of release coating 34 that soaks into the breathable fibrous second body 14.

When the first and second bodies 12, 14 are joined, the adhesive 18 couples the first body 12 to the second body elongated portion 30 and temporarily couples the first body 12 to the second body tab portion 32. Thus, the tab portion 32 acts as a removable liner for a portion of the adhesive 18 on the first body second surface 22.

The first and second bodies 12, 14 have a substantially constant thickness. The release coating 34, as mentioned above and discussed in detail below, is applied, and more preferably applied by a printing plate and pressure rolling system (not shown), to the first surface 26 of the second body tab portion 32. The release coating 34 does not have a substantial thickness. Thus, the combined thickness of the second body tab portion 32 and the release coating 34 is approximately equal to the second body elongated portion 30 first thickness. In this configuration, and after the first and second bodies 12, 14 are coupled, the first body first surface 20 and the second body second surface 28 are substantially parallel over the length of the first body 12 and the breathable fibrous second body 14. That is, the two outer surfaces of the wristband 10 are substantially parallel over the length of the wristband 10. This configuration, i.e. a substantially uniform thickness, allows a plurality of wristbands 10 to be wound about a core 52 in a symmetrical reel 54 (FIG. 3), as discussed below.

Further, in this configuration, the second body tab portion 32 is structured to be removed thereby exposing the adhesive 18 on the first body second surface 22. The exposed portion of the first body second surface 22 acts as an adhesive coupling device 40. The coupling device 40 is structured to be coupled to the first body first surface 20, thereby forming a torus about the user's wrist. Preferably, the adhesive coupling device 40 is the only coupling device on the wristband 10.

Further, the wristband 10 may include a security device in the form of a destructible score 42. A destructible score 42 is a score cut into at least the first body 12 and may be cut through to the breathable fibrous second body 14. The score 42, which is preferably disposed at, or near, the second body tab portion 32, is structured to be distorted and/or torn if the wristband 10 is stretched or removed. As is known, a destructible score 42 typically extends generally laterally across the wristband 10 and may be cut in a pattern, such as, but not limited to, a zigzag pattern. In this configuration, and after the wristband 10 is in use, i.e. the coupling device 40 is engaged; if a user attempts to pull the wristband 10 over their wrist, or attempts to enlarge the diameter of the wristband 10, the destructible score 42 will allow the wristband 10 to be distorted, torn, or peeled off at the location of the destructible score 42. This distortion may be made more visible by applying an indicia, typically a color but may be a pattern, to the printing surface 24 at the location of the destructible score 42. The color applied is different than the color of the surface below the destructible score 42. Thus, when the destructible score 42 is distorted, the color of the surface below the destructible score 42 shows through the destructible score 42.

Wristbands 10 are, preferably, structured to be used with a label printer (not shown). Label printers, as used herein, are unlike standard printers which may print labels in sheet form. That is, a "label printer" is structured to print on an elongated and narrow substrate. The substrate used with a label printer is typically provided in the form of a roll 50, as shown in FIG. 3. A roll 50 includes a generally cylindrical core 52, which is typically hollow, and a reel 54 of the substrate disposed about the core 52. The roll 50 is also generally cylindrical, but due to the narrowness of the substrate and the typical diameter of a complete roll 50, the roll 50 may also be described as a disk rather than as a cylinder. The reel 54 is made of a plurality of elongated wristbands 10, disposed in series and temporarily coupled to each other. Preferably, the ends of adjacent wristbands 10 are coupled by perforations 73 that extend perpendicular relative to the longitudinal axis of the wristbands 10. In this configuration, an individual wristband 10 may be fed into the label printer, have printing applied to the printable surface 24, and be torn from the roll 50.

Figure 5A:
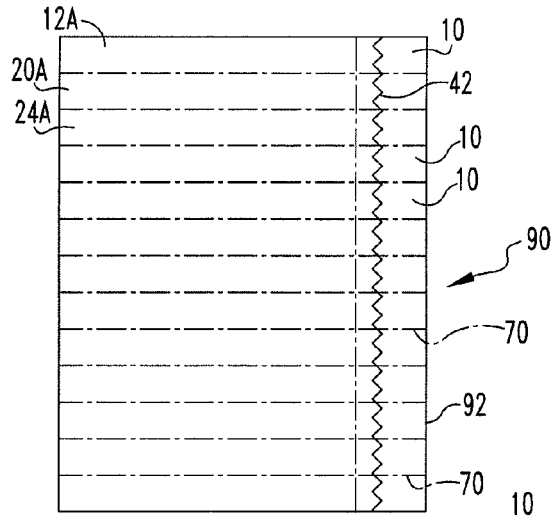
FIGS. 5A, 5B, and 5C each show one embodiment of a sheet form of material.
Figure 5B:
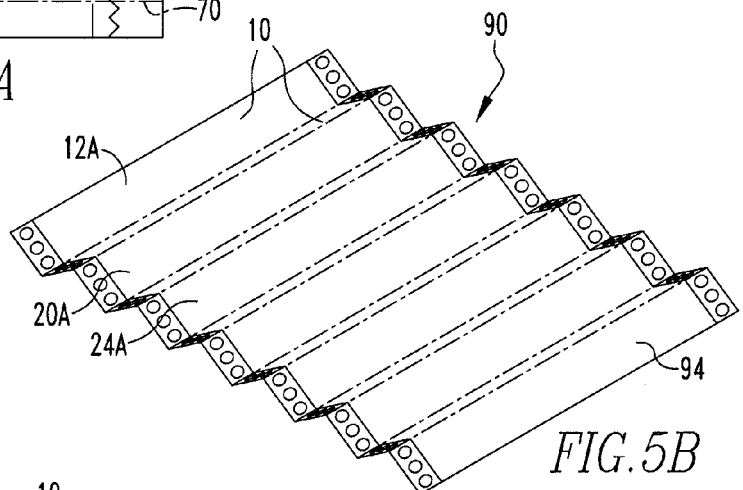
Figure 5C:
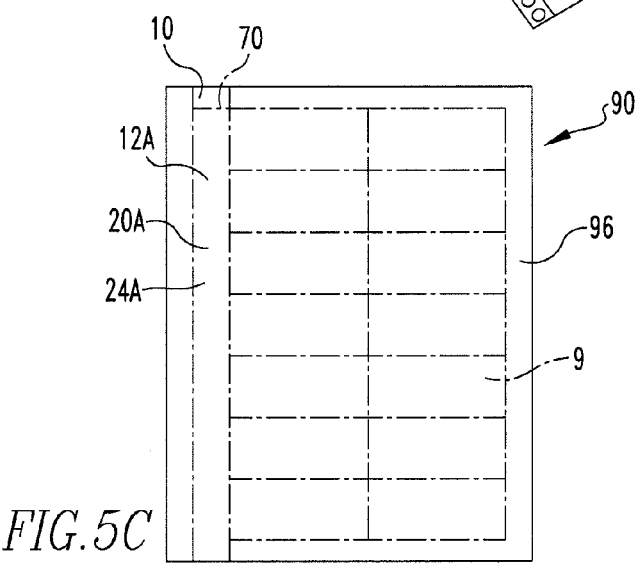

The wristbands 10, however, may also be disposed in sheet form 90 prior to printing. That is, the wristbands 10 may be coupled along their longitudinal edges, i.e. in parallel, thereby forming an individual sheet 92 (FIG. 5A) or a fan sheet 94 (FIG. 5B) which may include a fan folded sheet attached at the short end (not shown), or the wristband 10 may be part of a combined sheet 96 (FIG. 5C). In each of these embodiments, the sheet 90 includes an upper first body 12A, a lower second body (not shown), and an adhesive system (not shown). As before, the upper body 12 has a first, upper surface 20A which is a printing surface 24A. Similarly, the second body is made from a breathable fibrous material. Individual sheets 92 are sized to operate with common printers, such as but not limited to, laser printers and ink jet printers (neither shown). A fan sheet 94 is an elongated sheet which may be folded along any wristband 10 longitudinal edge in a manner similar to an accordion pleat. A fan sheet 94 is structured to operate with a printer having a continuous feed, such as, but not limited to, a dot matrix printer. A combined sheet 96 includes a wristband 10 and a number of labels 9. The wristband 10 and labels 9 are temporarily coupled to the combined sheet 96, as well as each other, by perforations 73. The combined sheet 96 is sized to operate with common printers, such as but not limited to, laser printers and ink jet printers (neither shown).

Figure 1:
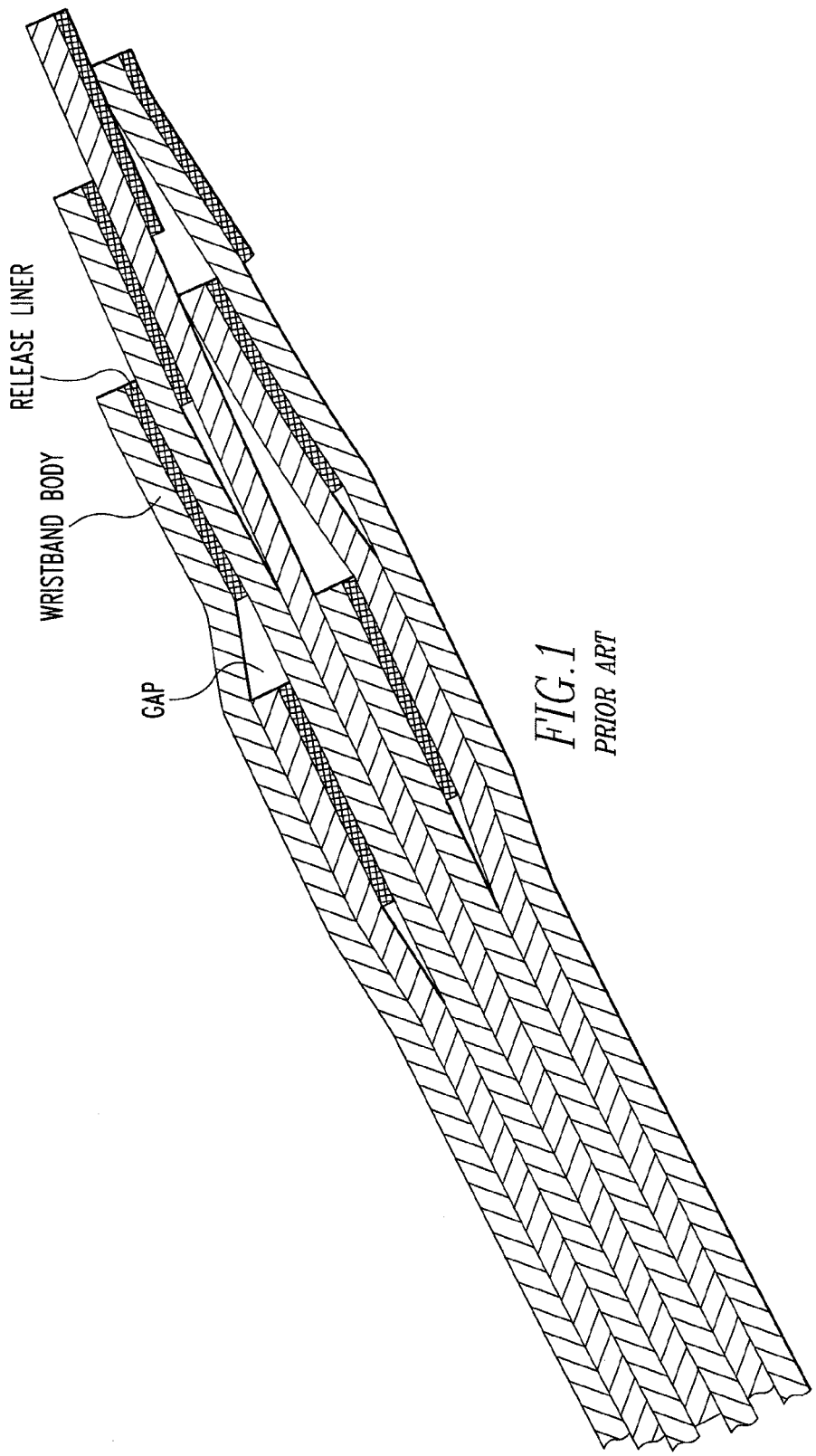
FIG. 1 is an exaggerated side view of portion of a roll of prior art wristbands.
Figure 4A:
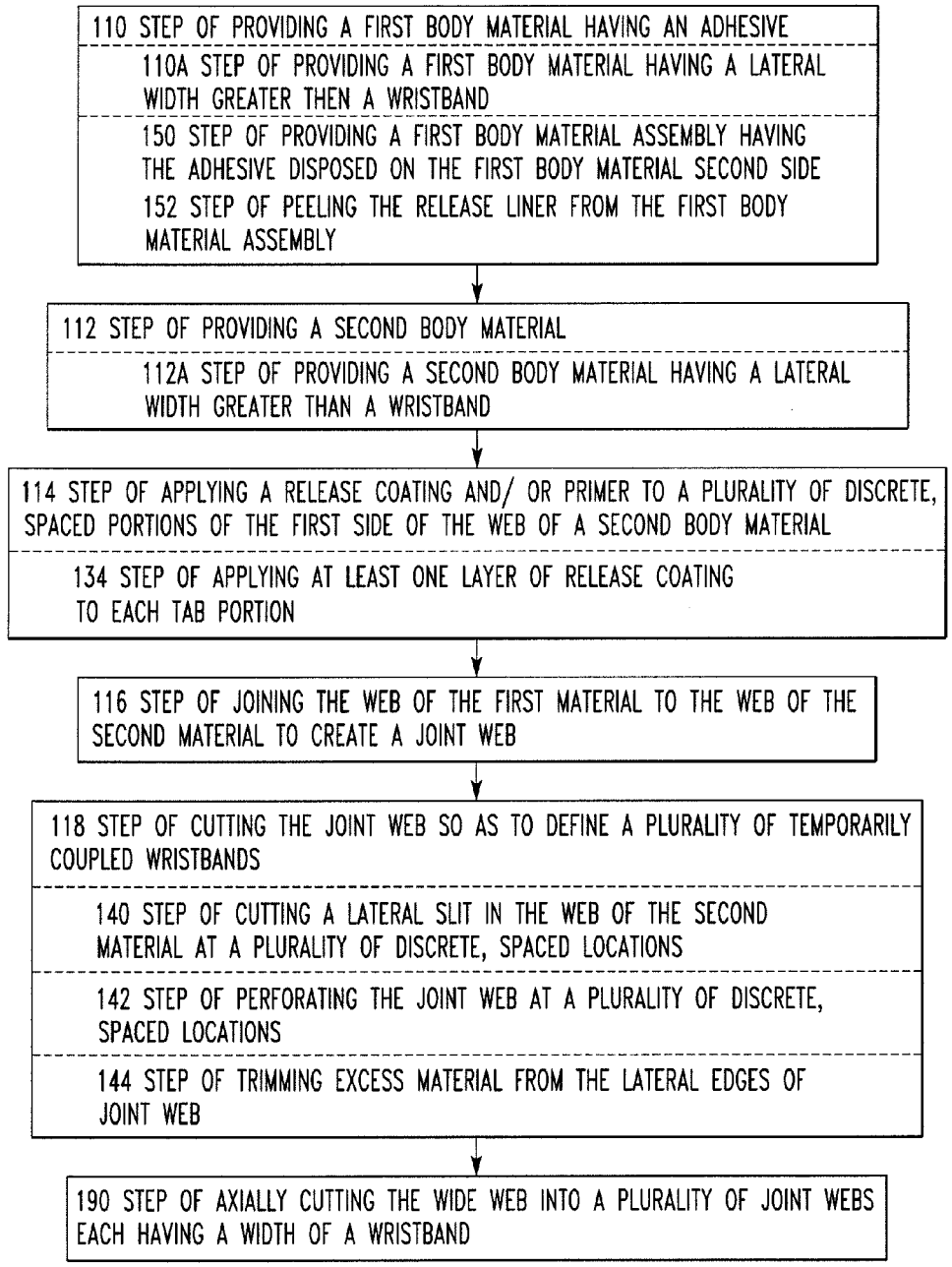
FIGS. 4A and 4B are flowcharts of the disclosed method.
Figure 4B:
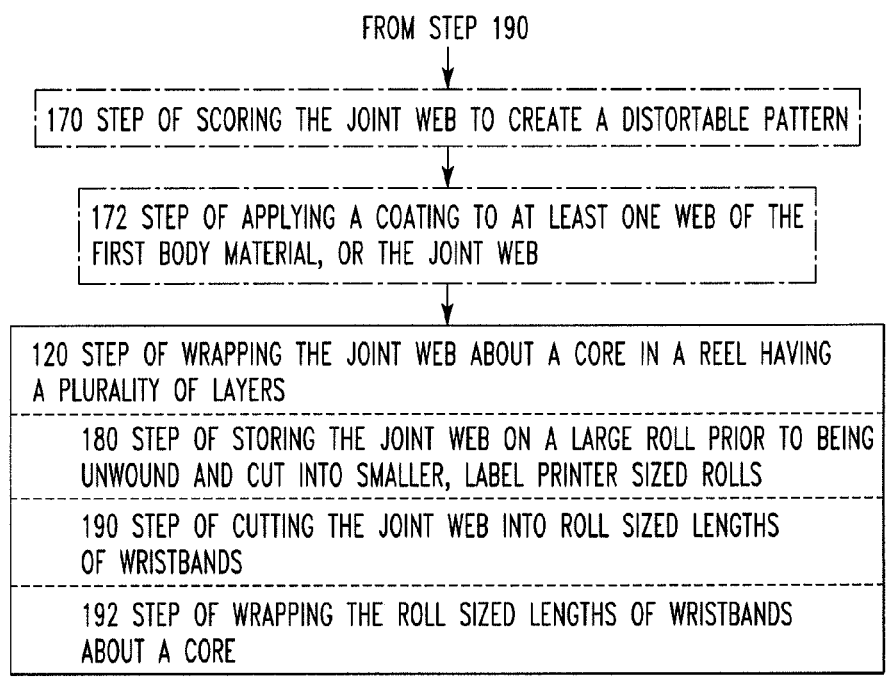
Figure 6:
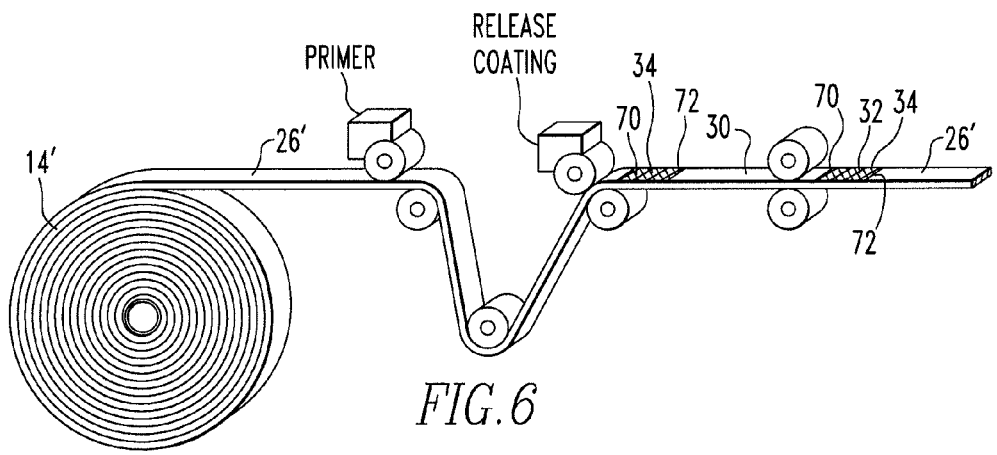
FIG. 6 is a schematic side view of a machine for processing the second material web.

The preferred embodiment, however, is a roll 50 of wristbands 10. As shown in FIGS. 4A and 4B and schematically shown in FIGS. 6-8, the wristband roll 50 is made using the following steps (FIGS. 4A and 4B): providing 110 a first body material having an adhesive 18 (FIG. 2), providing 112 a second body material (FIG. 5), applying 114 a release coating 34 (FIG. 2) to a plurality of discrete, spaced portions of the first side of the web of a second body material, joining 116 the web of the first material to the web of the second material to create a joint web, cutting 118 the joint web so as to define a plurality of temporarily coupled wristbands, and wrapping 120 the joint web about a core 52 (FIG. 3) in a reel 54 (FIG. 3) having a plurality of layers. It is noted that, the first body material is provided as an elongated web 12' having a first, upper surface 20' and a second lower surface 22'. The first body material web first surface 20' being a printing surface 24'. Further, the adhesive 18 is disposed on the first body material second side 22'. The second body material is also provided as an elongated web 14' of breathable fibrous sheet material having a first, upper surface 26' and a second lower surface 28'. The application of the release coating 34 defines sections of the second body material elongated web 14' as either an elongated first portion 30 (FIG. 2) or a tab portion 32 (FIG. 2). Hereinafter, each portion of the first side of the web of a second body material 14' having a release coating 34 applied thereto shall be identified as a "portion of release coating 34." Each portion of release coating 34 has a first edge 70 and a second edge 72, each of which extend between the lateral sides of the web. The elongated portions 30 and tab portions 32 are disposed alternately on the elongated web 14' of fibrous sheet material. The release coating 34 may be applied in layers. Thus, the step of applying 114 a release coating 34 may include the step of applying 134 at least one layer of release coating to each tab portion 32. In this configuration, the plurality of wristbands 10 may lay substantially flat when wound about the core 52. That is, the reel 54 does not include any substantial gaps between the layers.

As noted above, the release coating 34 may seep into the fibrous sheet material. Accordingly, the step of applying 114 a release coating 34 to a plurality of discrete, spaced portions of the first side of the web of a second body material 14', may include the step of applying 114 a primer 35 (FIG. 2) to a plurality of discrete, spaced portions of the first side of the web of a second body material 14'. The primer 35 is applied prior to the release coating 34.

The joint web is cut multiple times in different manners. One cut is used to create the separation between the second body elongated portion 30 and the second body tab portion 32. Thus, the step of cutting 118 the joint web includes the step of cutting 140 a lateral slit in the web of the second body material 14' at a plurality of discrete, spaced locations, each slit being disposed adjacent the first edge 70 of each portion of release coating 34. The step of cutting 118 the joint web further includes the step of perforating 142 the joint web at a plurality of discrete, spaced locations, each perforation 73 being disposed adjacent the second edge 72 of each portion of release coating 34. The material of the joint web in the space between two perforations is a wristband 10. Further, these two cuts define the removable tab portion 32 on each breathable fibrous second body 14. Finally, it is noted that the edges 70, 72 of the two webs of materials may not be aligned when the webs are joined. As such, the step of cutting 118 the joint web may include the step of trimming 144 excess material from the lateral edges of the joint web.

The first material may be purchased with the adhesive 18 (FIG. 2) already applied thereto. If the first material has an adhesive pre-applied, the adhesive 18 is likely protected by a release liner 80. Thus, prior to joining the two webs together, the release liner 80 must be removed. Accordingly, the step of providing 110 a first body 12 (FIG. 2) material may include the steps of providing 150 a first body material assembly having the adhesive 18 disposed on the first body material second surface 22 (FIG. 2), the adhesive 18 protected by an elongated web of a release liner 80 (FIG. 7); and peeling 152 the release liner 80 from the first body material assembly. The adhesive 18 may be incorporated into the joint web by any other known method such as, but not limited to, applying (not shown) the adhesive 18 to either the first or second bodies 12, 14.

As noted above, the wristband 10 may include a destructible score 42. If so, after the step of joining 116 the two webs, the method includes the further step of scoring 170 the joint web to create a distortable pattern. Further, given that wristbands 10 may be used in a hospital or other medical facility, the method may include the further step of applying 172 a protective coating 21 (FIG. 2) to at least one of the web of the first body material, the web of the second body material, or the joint web. The protective coating 21 helps resist damaging the printing by various substances, such as hand sanitizers, used in hospitals. The protective coating 21 may also be a substance such as, but not limited to, an antimicrobial coating.

As noted above, the substrate used in a label printer is, typically, provided as a roll 50. The method of creating the joint web described above, may be a continuous process or a nearly continuous process. This type of process may be made more efficient by providing webs having an extended lateral width. Such a web produces an elongated roll 50A, as shown in FIG. 8. In this instance, the roll 50A is elongated in an axial direction. The elongated roll 50A stores 180 the web prior to being unwound and cut into thinner, label printer sized rolls 50. Alternatively, the joint web may be cut into thin, label printer sized rolls 50 without being wound onto a storage roll. In either situation, the steps of providing 110 a first body material and providing 112 a second body material, include the steps of providing 110A a first body material having a lateral width greater than a wristband 10 and providing 112A a second body material having a lateral width greater than a wristband 10. The first and second bodies 12, 14 having such a width to create a wide web when joined. Subsequently, the steps of cutting 118 the joint web includes the step of axially cutting 190 the wide web into a plurality of joint webs each having a width of a wristband 10.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A wristband comprising:

a first thin, elongated body, a second thin, elongated body, and an adhesive system;

said adhesive system having an adhesive, said adhesive adhered to both said first body and said second body;

said first body having a first, upper surface and a second lower surface, said first body first surface being a printing surface, said adhesive disposed on said first body second surface;

said second body being a breathable fibrous sheet material, said second body having a first, upper surface, a second lower surface, said second body further having a first, elongated portion and a second tab portion;

said first body coupled to said second body elongated portion;

said first body temporarily coupled to said second body tab portion;

whereby said second body tab portion acts as a removable liner for a portion of the adhesive on said first body second surface;

wherein said first body first surface and said second body second surface being substantially parallel over the length of said first body and said second body;

said adhesive system includes a release coating, said release coating disposed on said first surface of said second body tab portion;

said second body tab portion being removable, thereby exposing a portion of said adhesive on said first body second surface, said exposed portion of said adhesive being an adhesive coupling device;

said adhesive coupling device coupled to one of said first body second surface or said second body first surface; and wherein said adhesive system includes a primer, said primer disposed on said first surface of said second body tab portion.

* * * * *